Patented Aug. 19, 1952

2,607,755

UNITED STATES PATENT OFFICE 2,607,755

PRODUCTION OF SILICON-CONTAINING RESINS

Raymond H. Bunnell, Toledo, Ohio, assignor to Libbey-Owens-Ford Glass Company, Toledo, Ohio, a corporation of Ohio No Drawing. Application December 4, 1948, Serial No. 63,607

5 Claims. (Cl. 260—45.4)

The invention relates to the production of silicon containing resins.

It is known that silicon-containing substances can be used to produce synthetic materials having cured characteristics superior in many respects to those of other synthetic materials. Recognized shortcomings of synthetic materials derived from silicon-containing substances are their relatively slow cure rates and high cost. It has been suggested that cured materials having many of the superior characteristics of those produced from silicon-containing substances but without their slow cure rates and high cost can be produced by modifying an alkyd resin with a siloxane obtained by hydrolysis of a silane.

Alkyd resins are available commercially, usually as solutions in such solvents as xylene (solvents not more volatile than xylene are ordinarily preferable). It is known that silanes are not conveniently hydrolyzed in such solvents as xylene because there is a great likelihood of the formation of a water emulsion which can be broken only with comparative difficulty. Silanes are readily hydrolyzed in such solvents as diethyl ether, without complications; therefore, the natural way to prepare a siloxane solution with which to modify an alkyd is to hydrolyze the silane as a solution in diethyl ether, mix the purified hydrolyzed solution with the final solvent (e. g., xylene), distill the ether, and mix the remaining siloxane solution with the alkyd. This method has been suggested, and has been used to produce resins that yield cured materials having many of the desirable characteristics of both silicones and alkyds.

It has been found, however, that silicone-modified alkyds prepared as described in the preceding paragraph lack the uniformly high quality essential to a commercial product in that the cured material frequently shows a haziness which is indicative of partial incompatibility and which interferes substantially with the marketability of the material because it is a visible defect.

The principal object of the invention is the production of improved silicon-containing resins. More specific objects and advantages are apparent from the description, which illustrates and discloses but is not intended to limit the scope of the invention.

The present invention is based upon the discovery that silicone-modified alkyds which can be used to produce cured materials of uniformly high quality that are free from haziness can be prepared by a simple method.

In the practice of the present invention synthetic resins are produced by a method that comprises hydrolyzing an organosilane in a hydrolyzing solution and in the presence of an organic solvent, adding a solution of the hydrolyzed product comprising the organic solvent to an alkyd resin, and heating the resulting mixture.

It has been discovered that the haziness commonly found in silicone-modified alkyds heretofore produced can be eliminated by hydrolyzing the organosilane in the presence of an organic solvent and then combining the hydrolyzed product and the alkyd without first distilling off all of such solvent. The solvent may be distilled after the combination of the alkyd with the siloxane, or the solvent may be of such a character that it can be allowed to remain in the final product.

Synthetic resins are produced in the practice of the invention by mixing an organic solvent solution of the products of hydrolysis of a silane with an alkyd resin, and heating the resulting mixture. The silane that is hydrolyzed can be a single silane or a mixture of silanes. Organosilanes that can be used in the practice of the invention consist of a silicon atom to which are attached four monovalent radicals, not more than two of which are organic radicals such as primary or secondary alkyl radicals, aralkyl radicals, aryl radicals or alkaryl radicals each having from 1 to 12 carbon atoms, the remainder of said monovalent radicals being hydrolyzable radicals. A primary or secondary alkyl radical attached to the silicon atom can be methyl, ethyl, propyl, isopropyl, n-butyl, isobutyl, secondary butyl or any primary or secondary alkyl radical having from 5 to 12 carbon atoms. When the alkyl radical is methyl the procedure by which the hydrolysis products are combined with the alkyd resin should be conducted carefully in order to avoid gelling the mixture before compatibility is achieved. It has been suggested that gelling can be avoided by using butanol as the solvent and gradually raising the temperature of the mixture to about 190° C., then cooling and adding more butanol and gradually raising the temperature of the mixture to about 225° C. If the reactants are mixed and heated under reflux for about one hour using xylene as the solvent the mixture gels to a worthless mass. It is significant that ethyl does not act like a homologue of methyl in this respect, as is demonstrated by the example hereinafter given. An aralkyl radical attached to the silicon atom can be a benzyl, phenylethyl, naphthylmethyl or naphthylethyl radical. An aryl radical attached to the silicon atom can be phenyl, a naphthyl or any diphenyl. An alkaryl radical attached to the silicon atom can be a mono-, di- or tri-alkyl substituted phenyl radical in which each substituent is methyl, ethyl, either propyl, any butyl, any pentyl or any hexyl radical so long as the total number of carbon atoms in the alkyl substituents does not exceed 6; the alkaryl radical can also be a mono- or di-methyl-substituted naphthyl or an ethyl-substituted naphthyl radical. "Hydrolyzable radical" is used herein to include halo, alkoxy, amino, aroxy and acyloxy. The halo radical is any one having an atomic weight less than 80 (i. e., fluoro, chloro or bromo). The alkoxy radical is any primary or secondary alkoxy radical having from one to four carbon atoms (i. e., methoxy, ethoxy, propoxy, isopropoxy, n-butoxy, isobutoxy, or secondary butoxy). Amino is simply the —NH₂ group. Aroxy radicals are any in which the aryl group is phenyl, or a mono-, di- or tri-substituted phenyl radical, each substituent being a primary, secondary or tertiary alkyl radical having from one to five carbon atoms, the total number of carbon atoms in the side chains being not more than five (i. e., the aryl radical is phenyl, or ortho-, meta- or para-methyl phenyl, any di- or tri-methyl phenyl, or any substituted phenyl in which the substituents are: one ethyl; one ethyl and one methyl; two ethyls; two methyls and one ethyl; two ethyls and one methyl; either propyl radical; either propyl radical and methyl; either propyl radical and two methyls; either propyl radical and ethyl; any butyl radical; any butyl radical and methyl; or any pentyl radical). The acyloxy radical has the general formula

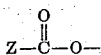

in which Z is a saturated or unsaturated straight, branched or closed chain hydrocarbon radical having from one to eighteen carbon atoms, or phenyl or substituted phenyl, the substituents, if any, consisting of from one to three alkyl radicals each having from one to five carbon atoms, and all having a total of not more than five carbon atoms, as hereinbefore described.

Silanes that can be used in the practice of the invention also include those having not more than two hydrogens attached to the silicon atom in the silane molecule. Hydrogen acts as either a hydrolyzable or an organic radical, depending upon the particular hydrolyzing solution that is used. For example, if the hydrolyzing solution is a dilute water solution of a mineral acid, of water alone, hydrogen is not hydrolyzed, and acts as an organic radical; on the other hand, if the hydrolyzing solution is a dilute water solution of a base, hydrogen is hydrolyzed, so that it acts as a hydrolyzable radical. Thus, whether hydrogen is counted as a hydrolyzable radical or as an organic radical (e. g., in computing the $r/Si$ ratio, as hereinafter described) depends upon what hydrolyzing solution is employed.

Examples of silanes that can be hydrolyzed to produce products used to modify alkyd resins in the practice of the invention include methyltrifluoro- or chloro- or bromo-, dimethyldifluoro- or chloro- or bromo-, ethyltrifluoro- or chloro-, diethyldichloro-, n-propyltrifluoro- or chloro-, di-n-propyldichloro, isopropyltrifluoro-, n-butyltrifluoro- or chloro-, di-n-butyldifluoro-, isobutyltrichloro-, secondary butyltrichloro-, n-pentyltrifluoro- or chloro-, di-n-pentyldifluoro-, 2 - methylpentyltrichloro-, 3(2,2,4-trimethylpentyl)-trichloro-, methylchlorodifluoro-, methylfluorodichloro-, dimethylfluorochloro-, diethyldiethoxy-, ethyltrimethoxy- or ethoxy- or propoxy- or n-butoxy- or isopropoxy-, monohydrotrichloro- or bromo- or fluoro-, dihydrodichloro-, monohydromethyldichloro-, monohydroethyldichloro-, monohydrophenyldichloro-, trihydromethyl-, dihydromethylchloro-, dihydrodimethyl-, diethylchloroethoxy-, ethylchlorodiethoxy-, n-propylchlorodifluoro-, n-propylfluorodichloro-, isopropylchlorodifluoro-, isopropylfluorodichloro-, n-butylchlorodifluoro-, n-butylfluorodichloro-, isopentyltrichloro-, ethylmethyldichloro-, methylpropyldichloro-, n-butylmethyldichloro-, n-hexylmethyldichloro-, methyltriethoxy- or n-butoxy-, a methyloctyldichloro-, dimethyldiethoxy- or n-butoxy-, dimethylchloro-n-butoxy, n-propyltriethoxy-, isopropyltriethoxy-, n-butyltriethoxy-, isobutylchloromethoxyethoxy-, isopentyltriethoxy-, ethyldiethoxyacetoxy-, phenyltrifluoro- or ethoxy- or propoxy- or isobutoxy-, diphenyldifluoro- or chloro- or bromo- or ethoxy- or phenoxy-, ethylphenyldichloro-, phenylmethyldiethoxy-, ethylbenzyldichloro-, diphenylchlorophenoxy-, phenylbenzyldiethoxy-, benzyltriethoxy-, (2,4-dimethylphenyl)triethoxy-, alpha - naphthyltriethoxy-, beta-naphthyltriethoxy-silanes and the like.

Organosilanes that consist of a silicon atom to which are attached four monovalent radicals, not more than two of which are primary or secondary alkyl radicals, aralkyl radicals, aryl radicals or alkaryl radicals and have from 1 to 12 carbon atoms, the remainder of such monovalent radicals being hydrolyzable radicals, are prepared by means of a Grignard reaction between (1) a silicon tetrahalide, an alkyl orthosilicate, an organotrihalosilane or an organotrialkoxysilane and (2) a halo-substituted hydrocarbon, in the presence of magnesium; the halo-substituted hydrocarbon and the magnesium are believed to react to produce an organo magnesium halide which then reacts with the silicon tetrahalide, alkyl orthosilicate, organotrihalosilane or organotrialkoxysilane. Such reactions proceed at a faster rate at elevated temperatures and are usually exothermic in nature. It is ordinarily desirable, therefore, to conduct the reaction in a vessel equipped with a heating coil and cooling means (e. g., a reflux condenser) so that the reactants can be heated to such a temperature that the reaction proceeds at a substantial rate, and then the maximum output of heat generated by the reaction can be removed through the cooling means. It is usually desirable to conduct the reaction in the presence of diethyl ether as a solvent; the ether has the double effect of initiating the Grignard reaction and of facilitating control of the temperature in the reaction vessel. The reaction proceeds less readily to produce alkoxysilanes than it does to produce halosilanes so that it may be desirable to conduct the reaction between an organo magnesium halide and an alkyl orthosilicate under somewhat more drastic conditions than are usually desirable when the reaction is conducted with a tetrahalosilane. This is particularly true when the reaction is used to produce a dialkoxysilane from an alkyl orthosilicate; in this case, it may be desirable to initiate the reaction in the presence of diethyl ether and then to supply sufficient heat to the reactor so that all the ether is distilled. The reaction is then conducted at a sufficiently high temperature that two alkoxy radicals are replaced by organo radicals. The magnesium salts produced during the course of the reaction are removed by filtration, and the organosilanes are isolated by fractional distillation of the filtrate. The silanes so produced have hydrolyzable groups which are halo radicals or alkoxy radicals. Silanes having, attached to the silicon atom in the silane molecule, one or more amino radicals are produced by reaction between ammonia and an appropriate silane having one or more halo radicals attached to the silicon atom. By such a reaction halo is replaced by NH₂; organosilanes containing amino groups as hydrolyzable radicals can be produced by such a reaction.

Silanes having hydrolyzable radicals which consist of acyloxy groups are produced by reaction between an acid anhydride and the appropriate silane having hydrolyzable radicals which consist of alkoxy groups, or, in some instances, by reaction between an appropriate silane having hydrolyzable halo radicals and the sodium salt of the suitable organic acid.

Silanes having aroxy radicals attached to the silicon atom in the silane molecule are prepared by reaction between the corresponding halosilane and phenol or a monoalkyl-, dialkyl- or trialkyl-substituted phenol in which each alkyl substituent has from one to five carbon atoms, and all the alkyl substituents contain a total of not more than five carbon atoms as hereinbefore described.

As the foregoing discussion indicates, silanes having hydrolyzable radicals which consist of halo or alkoxy groups are prepared directly from a silicon tetrahalide or from an alkyl orthosilicate, while silanes having hydrolyzable radicals which consist of amino, acyloxy or aroxy groups are prepared as secondary products, i. e., by reacting the product of one of the first reactions in order to change the hydrolyzable radicals. As a consequence, silanes having hydrolyzable radicals which consist of halo or alkoxy groups are less expensively prepared when a Grignard reaction is used to produce the silanes than are those having hydrolyzable radicals which consist of amino, acyloxy or aroxy groups and are, ordinarily, preferred. This is particularly true because the hydrolyzable radicals are removed from the silane molecule by the hydrolysis reaction so that they do not form a part of the silicon-containing resin produced in the practice of the invention. However, all hydrolyzable radicals do not undergo hydrolysis at the same rate the most readily hydrolyzed being halo. Amino, acyloxy, alkoxy and aroxy are more difficult to hydrolyze than is halo, alkoxy and aroxy being the most difficult, and in instances where rate of hydrolysis is of particular importance, it may be preferred to use a more expensive silane having hydrolyzable radicals that are amino, acyloxy or aroxy.

Silanes (that can be used in the practice of the invention) having hydrolyzable radicals that are halo groups are also produced by means of a reaction between an alkene or an aryl alkene having from 2 to 12 carbon atoms and a silane whose molecule consists of a silicon atom to which are attached (a) from one to two hydrogens; (b) from two to three halogens; and (c) not more than one radical that is alkyl, aralkyl, aryl or alkaryl and has not more than 12 carbon atoms. Such a reaction provides a particularly desirable method for producing silanes to be used in the practice of the invention because it is well adapted to being conducted continuously using inexpensive starting materials. It is believed that this reaction can be used to produce certain organohalosilanes inexpensively and in large quantities; consequently, organosilanes having hydrolyzable radicals that are halo groups are the most desirable starting materials for use in the practice of the invention. Silanes that are produced by means of such reaction have alkyl radicals derived from alkenes by the addition of a hydrogen to one of the carbon atoms linked by the double bond in the alkene molecule, or aralkyl radicals so derived from the aryl alkene, the free valence being attached to the other of the carbon atoms linked by the double bond in the alkene or aryl alkene. Such alkyl or aralkyl radicals have from 2 to 12 carbon atoms; the alkyl radicals may be straight or branched chains, whereas the aralkyl radical may be a phenylethyl, naphthylethyl, phenylpropyl or (alkylphenyl)ethyl radical. Silanes having such alkyl or aralkyl radicals are also preferred starting materials, the most desirable ones having alkyl radicals derived from the most readily available and inexpensive alkenes, for example, ethylene.

Examples of the halo-substituted hydrocarbons that can be reacted with a silicon tetrahalide, an alkyl orthosilicate, an organotrihalosilane or an organotrialkoxysilane, in the presence of magnesium, as hereinbefore described, include primary and secondary alkyl halides, such as methyl bromide or chloride or iodide, ethyl bromide or chloride, n-propyl bromide or chloride, isopropyl bromide or chloride, n-butyl bromide or chloride, secondary butyl bromide or chloride, isobutyl bromide or chloride, n-amyl bromide, isoamyl bromide, secondary amyl bromide, n-hexyl bromide, n-heptyl bromide, 3-bromoheptane, 4-bromoheptane, n-octyl bromide, 2-bromooctane, 2-iodononane, 1-bromo-3-methylnonane, 4-chloro-4-methylnonane, 5-chloro-5-methylnonane, 2-bromodecane, 1-bromo-6-methyldecane, 2-chloro-2-methyldecane, 5-chloro-5-ethyldecane, 1-bromododecane and 4-bromododecane; halo derivatives of hydrocarbons of the benzene series, such as bromobenzene alpha-bromotoluene, alpha-iodotoluene, o-bromotoluene, m-bromo-toluene, p-bromotoluene, 4-bromo-o-xylene, 4-bromo-m-xylene, 5-bromo-m-xylene, 2-bromo-p-xylene, 3-bromopseudocumene, 5-bromopseudocumene, 6-bromopseudocumene, 2-bromomesitylene, 3-bromo-o-xylene, 2-bromo-1-ethyl benzene, 4-bromo-1-ethyl benzene, 4-bromo-1,3-diethyl benzene, 2-iodo-1,3,5-triethyl benzene, 6-bromo-3-ethyl toluene, 2-bromo-4-ethyl toluene, 4-bromo-1-propyl benzene, 4-bromo-isopropyl benzene, 4-bromo-1-methyl-3-isopropyl benzene, 6-bromo-1-methyl-3-isopropyl benzene, 2-bromo-p-cymene, 3-bromo-p-cymene, 4-bromo-1-butyl benzene, 4-bromo-1-tertiary butyl benzene, 4-bromo-1-isoamyl benzene and 4-bromo-1-tertiary amyl benzene; and halo derivatives of hydrocarbons of the naphthalene series, such as alpha-bromonaphthalene, beta-bromonaphthalene, 1-bromo-8-methyl naphthalene, 1-bromo-7-methyl naphthalene, 1-bromo-2-methyl naphthalene, 4-bromo-2-methyl naphthalene, 8-bromo-2-methyl naphthalene, 1-bromo-5-methyl naphthalene, 1-bromo-2,7-dimethyl naphthalene, 4-bromo-1,6-dimethyl naphthalene, 1-bromo-2,6-dimethyl naphthalene, 4-bromo-1,2-dimethyl naphthalene, 1-bromo-2,3-dimethyl naphthalene, 1-bromo-4-methyl naphthalene and 7-bromo-1-methyl naphthalene.

Examples of alkenes that can be reacted with a silane whose molecule consists of a silicon atom to which are attached (a) from one to two hydrogens; (b) from two to three halogens; and (c) not more than one radical that is alkyl, aralkyl, aryl or alkaryl and has not more than 12 carbon atoms, as hereinbefore described, include ethylene, propene, and any butene, pentene, hexene, heptene, octene, nonene, decene, undecene or dodecene. Styrene, allyl benzene, 3-allyl toluene and alpha vinylnaphthalene are examples of aryl alkenes that can be so reacted.

Silanes are hydrolyzed in the practice of the invention by means of a two-phase hydrolysis reaction. It may be possible to conduct such hydrolysis reaction by adding the silane or silene mixture to a hydrolyzing solution or to a two-phase mixture of an organic solvent and a hydrolyzing solution (the hydrolyzing solution is usually water, but may be, occasionally, a water solution of a base, or a dilute water solution of an inorganic acid) or by adding the solution or two-phase mixture to the silane, but it is ordinarily preferable that the silane or silane mixture be dissolved in an organic solvent and that this silane solution be added to a hydrolyzing solution, or that the hydrolyzing solution be added to the silane solution. The organic solvent that is used can be one boiling (at atmospheric pressure) as high as about 200° C., but it is usually preferable to use one boiling not higher than about 165° C., and most desirable to use one boiling not higher than about 130° C. The solvent that is used should be one that is not substantially soluble in water and that is sufficiently high boiling so that it is not distilled during the hydrolysis reaction, i. e., should boil (at atmospheric pressure) at a temperature not substantially lower than 30° C. Examples of the solvents that can be used include hydrocarbon solvents such as benzene, toluene, xylenes, hexanes, heptanes, and octanes; and ethers such as diethyl, ethylpropyls, dipropyls and propylbutyls. Higher aliphatic alcohols (which are not substantially soluble in water) such as n-butanol, the pentanols and the hexanols may make up a minor portion (i. e., not more than about 10 weight per cent) of the solvent. As has been stated hereinbefore, hydrolysis of silanes in xylene solution is difficult because of the formation of an emulsion; however, this emulsion can be broken (e. g., by heating) and the hydrolysis products so obtained can be mixed with alkyds in the practice of the invention. Because hydrolysis proceeds more readily when the silanes are dissolved in ether solvents, without such complications as the formation of emulsions, it is usually preferable to use a dialkyl ether having from 4 to 6 carbon atoms as the solvent for the silanes. The most desirable solvent is diethyl ether. Ethylmethyl ether can also be used, but is usually not commercially practicable because of its low boiling point. A solvent is considered to be not substantially soluble in water if it is soluble to an extent not exceeding about 10 grams per 100 cc. of water at about 25° C.

Most desirably the silanes are hydrolyzed by adding the silane solution to the hydrolyzing solution slowly (i. e., usually at such a rate that one mol of silanes is added in not less than about 5 minutes, although, in some instances, a slightly faster rate of addition can be used; it is ordinarily preferable that the silanes be added at such a rate that one mole is added in not less than about 15 minutes, and most desirable that the rate be such that one mol is added in not less than about 25 minutes; it is usually desirable that the rate be such that not more than one hour is required to add one mol of silanes). The addition is made at such a rate that the exothermic hydrolysis reaction does not cause local overheating. It is usually desirable that the hydrolyzing solution be stirred during the silane addition; otherwise, local overheating may result in spite of a slow rate of silane addition.

The hydrolyzing solution that is used should comprise at least about one mol of water for every two equivalents of hydrolyzable radicals to be hydrolyzed, and may comprise a substantial excess, e. g., as much as about 40 mols of water for every two equivalents of hydrolyzable radicals, but it is usually preferable that the hydrolyzing solution comprise from about 25 to about 30 mols of water for every two equivalents to be hydrolyzed. When the hydrolyzing solution is a dilute water solution of an inorganic acid, the inorganic acid can be any mineral acid, such as hydrochloric, phosphoric or sulfuric, hydrochloric usually being preferred. An extremely dilute solution is usually preferred, e. g., one containing only a few drops of about one normal acid per mol of water, although one that is as much as about one-half normal may be used in some instances. When the hydrolyzing solution is a dilute water solution of a base, it is usually preferable that the base be an alkali metal hydroxide, sodium hydroxide usually being most desirable because of its availability and low cost, although other soluble metal hydroxides such as alkaline earth metal hydroxides, can be used. The concentration of the base in the hydrolyzing solution should be within the range indicated for the concentration of the inorganic acid.

The amount of the organic solvent that is present during the hydrolysis reaction may vary within wide limits, depending upon various circumstances, such as the solubility of the solvent in water, the per cent of solids desired in the finished alkyd silicone, and the rate at which the silane is hydrolyzed. Usually, it is desirable that the volume of the solvent used be at least about equal to one-half the volume of the silanes being hydrolyzed, and it may be advantageous that the volume of solvent be as much as ten times the volume of the silanes being hydrolyzed. It is usually preferable, however, that the volume of the solvent be at least about equal to the volume of the silanes, and not greater than about five times the volume of the silanes. A large volume of solvent tends to retard the rate of hydrolysis, so that an easily hydrolyzed silane may advantageously be hydrolyzed with a larger volume of solvent than is desirable with a more difficultly hydrolyzable silane.

After an organosilane has been hydrolyzed, as hereinbefore described, a silanediol can be added to the solution of hydrolysis products; the resulting combination is then mixed with the alkyd resin and heated. Examples of known silanediols include diethylsilanediol, ethylphenylsilanediol, ethylbenzylsilanediol, di-n-propylsilanediol, di-n-butylsilanediol, diphenylsilanediol, phenylbenzylsilanediol, dibenzylsilanediol and di(p-methylphenyl)silanediol.

The cured characteristics of resins produced by the method of the invention can be varied by changing the $r/Si$ ratio of the silane or silane mixture that is hydrolyzed. ("$r/Si$ ratio" is used herein to indicate the total number of non-hydrolyzable radicals attached to silicon atoms in the molecules of the silanes divided by the total number of silicon atoms.) It is usually desirable that the $r/Si$ ratio be at least about 0.6, and preferable that it be at least about 0.8. Ordinarily it is most desirable that the $r/Si$ ratio be about 1.0. It is desirable that the $r/Si$ ratio be not greater than about 1.8, and preferable that it be not greater than about 1.3. The organosilane that is hydrolyzed, as hereinbefore described, can be a single silane or a mixture of two or more silanes. No silane used in the practice of the invention has an $r/Si$ ratio higher than 2.0; so this is the maximum possible $r/Si$ ratio. It has been found that resins having satisfactory characteristics for many uses can be produced by modifying an alkyd resin with the products of the hydrolysis of a single silane having an $r/Si$ ratio of 2.0, e. g., diphenyldichlorosilane, but it is usually preferable to produce a somewhat faster curing resin having greater cured hardness by using a mixture of silanes having a lower $r/Si$ ratio within the range hereinbefore set forth. A lower $r/Si$ ratio can be achieved by using a mixture of silanes, some of which have an $r/Si$ ratio of 2.0 and some of which have an $r/Si$ ratio of 1.0; in some instances it may be advantageous to modify the silane mixture further by incorporating therein a tetrafunctional silane such as a silicon tetrahalide, e. g., silicon tetrachloride, silicon tetrabromide or silicon tetrafluoride, or an alkyl orthosilicate in which the alkyl radical is a primary or secondary alkyl radical having from one to four carbon atoms, e. g., ethyl orthosilicate. Such modification is required when it is desired to achieve an $r/Si$ ratio lower than 1.0.

A solution of the hydrolyzed product comprising the organic solvent (i. e., a solution of the products of hydrolysis of the organosilane which includes at least a substantial portion of the organic solvent in which the organosilane is dissolved prior to hydrolysis) is added to an alkyd resin, and the resulting mixture is heated, in the practice of the invention. As has been hereinbefore stated, the organosilane is hydrolyzed by means of a two-phase hydrolysis reaction. When the hydrolysis is considered to be complete, the two layers (i. e., the water layer and the silane layer) are separated; because the two layers are not completely immiscible, it is usually desirable to wash the silane layer with water, combine the washings with the water layer and then extract the combined water layer and washings with an organic solvent, usually, for convenience, the solvent in which the organosilane was dissolved prior to hydrolysis, although any solvent that is substantially water insoluble and volatile (as these terms are hereinbefore defined) can be used. This extract is then combined with the silane layer, and the mixture constitutes a solution of the hydrolyzed product comprising an organic solvent. It is usually desirable that this solution be dried, e. g., over anhydrous calcium chloride or sodium sulfate, before it is mixed with the alkyd resin, and it may be advantageous to add other materials, such as the desired amount of a solvent other than that in which the silane is dissolved prior to hydrolysis (usually one higher boiling than that solvent) or a material that modifies the characteristics of the finished resin. It has been found that in some instances a portion of the solvent in which the silane is dissolved prior to hydrolysis, e. g., diethyl ether, can be distilled after the solution is dried and before it is mixed with the alkyd resin. For example, as much as about one-third of the diethyl ether can be distilled from the dried solution of hydrolysis products prepared as described in the first paragraph of the example given below; when the rest of the example is carried out as described it is found that a resin indistinguishable from that produced by the procedure set forth in the example results. Apparently, however, such distillation of a part of the hydrolysis solvent before the solution is added to the alkyd resin increases the tendency of the finished resin to produce hazy films, so that it is usually preferred not to distil any of the hydrolysis solvent until after the solution of hydrolysis products has been added to the alkyd resin. In any event, it is desirable that the amount of this solvent distilled before the solution is mixed with the alkyd be small enough so that the amount remaining (in which the hydrolysis products are dissolved) is not less than about one-half of the volume of the silanes before hydrolysis, and preferable that it be such that the amount remaining is not less than about the volume of the silanes before hydrolysis.

The alkyd resin with which the solution of the hydrolyzed product is mixed in the practice of the invention may be any of the available alkyd resins. It is usually preferred to use a commercial alkyd resin because of the cost advantage. The basic reactants from which a commercial alkyd resin is produced are glycerol and an aromatic dicarboxylic acid. The aromatic dicarboxylic acid can be phthalic acid, iso-phthalic acid, terephthalic acid, naphthalic acid or a mono-, di-, tri- or tetra-chloro- or alkyl-substituted phthalic acid, each alkyl substituent being primary, secondary, or tertiary, and having from one to five carbon atoms. Ordinarily, it is most desirable to use phthalic acid as the aromatic dicarboxylic acid, because it is the most readily available and the least expensive of the acids that are available in a pure form. When it is desired to produce a resin that is comparatively inexpensive, color being not of critical importance, it may be preferable to use abietic acid, usually in the form of dry-distilled rosin, in addition to the aromatic dicarboxylic acid. Further, if a flame resistant resin is desired, one of the chloro-substituted phthalic acids may be advantageous. In addition, at least one fatty acid is usually reacted to produce the alkyd resin, by adding it to the glycerol and the aromatic dicarboxylic acid and then reacting, by reacting the glycerol and the fatty acid and then adding the aromatic dicarboxylic acid and reacting further, or by reacting the glycerol and the aromatic dicarboxylic acid and then adding the fatty acid and reacting further. Examples of the fatty acids that are used to produce alkyds include capric, lauric, myristic, palmitic, stearic, palmitoleic, oleic, linoleic, linolenic, elaeostearic, ricinoleic, and erucic acids. Commercial alkyds are available having an excess of hydroxyl groups (over the total carboxyl groups in the fatty acids and aromatic dicarboxylic acids) ranging from about 2 to about 40 per cent, and having a ratio of fatty acid to aromatic dicarboxylic acid ranging from about one equivalent of fatty acid per four equivalents of aromatic dicarboxylic acid to about three equivalents of fatty acid per five equivalents of aromatic dicarboxylic acid. The fatty acids are available commerically as their glycerol esters, which are oils derived from natural sources; examples of the oils that provide sources for the fatty acids include coconut oil, palm kernel oil, babassu oil, murmuru oil, palm oil, rape seed oil, mustard seed oil, olive oil, peanut oil, sesame oil, corn oil, cottonseed oil, soybean oil, sunflower oil, walnut oil, linseed oil, perilla oil, castor oil, tung oil, oiticica oil, whale oil and menhaden oil. Beef tallow, and lard, sardine and herring oils also contain fatty acids. Usually, the oil itself is added to the reaction mix to provide the fatty acid or acids.

In general, an alkyd resin is produced by a reaction that involves two OH groups, one of which is the hydroxy radical of an alcohol (the alcohol, as indicated herein, is usually polyhydric), and the other of which is in a carboxylic acid radical. Commercially useful alkyds are derived from compositions comprising an excess of from about 2 to about 40 per cent of OH groups derived from alcohols over OH groups derived from carboxylic acids. This excess is used in order to obtain an alkyd resin having a comparatively low acid number without the necessity for an unduly protracted reaction time or the use of a modifying agent such as aniline or toluidine. Alkyd resins with comparatively low acid numbers (usually not higher than about 10) are desirable because they do not react with the pigments ordinarily employed; an alkyd resin with a high acid number may also be unsuited for use with nitrocellulose. (Acid anhydrides are herein considered to have the same number of carboxylic OH groups per molecule as the corresponding acid.) It is usually desirable that the ratio of OH groups derived from the aromatic dicarboxylic acid, the fatty acid and the glycerol to total OH groups in the composition that is reacted to produce the alkyd resin be at least about 9:10. If substantially less than nine-tenths of the reacting OH groups are derived from the aromatic dicarboxylic acid, the fatty acid and the glycerol, the characteristics of the finished resin are likely to be impaired. Ordinarily, it is preferable that the ratio of OH groups derived from the aromatic dicarboxylic acid, the fatty acid and the glycerol to total OH groups in the composition be at least about 97:100, and most desirable that it be at least about 99:100. When acids other than aromatic dicarboxylic acids are used to produce an alkyd, or alcohols other than glycerol, the purpose is to modify specific characteristics of the resin; this modification, however, should be accomplished without impairing other desirable characteristics of the resin. It is to avoid impairment of other desirable characteristics of the resin that the proportion of OH groups not derived from the aromatic dicarboxylic acid, the fatty acid and the glycerol is usually not greater than about 1:100.

Any dicarboxylic acid can be used, in the preparation of the alkyd resin, in place of part of the aromatic dicarboxylic acid, and any polyhydric alcohol can be used in place of part of the glycerol. The amount of such modifying agents used should be within the range hereinbefore indicated. The glycols whose use as modifiers is usually preferred include ethylene glycol, propylene glycol, dipropylene glycol, any butylene glycol, any polymethylene glycol in the series from trimethylene glycol to decylene glycol (e. g., decamethylene glycol), or any polyethylene glycol in the series from diethylene glycol to nonaethylene glycol; the acids whose use as modifiers is usually preferred include itaconic, citraconic, maleic, fumaric or mesaconic acid, any normal acid in the series from oxalic and malonic to sebacic, any cyclohexane dicarboxylic acid, or diglycolic, dilactic or resorcinol diacetic acid. Modified alkyd resins can also be produced using monocarboxylic aromatic acids such as benzoic acid, monocarboxylic aliphatic acids having comparatively high boiling points, e. g., butyric, valeric, caproic or enanthic acid, or other polyhydric alcohols, such as pentaerythritol, dipentaerythritol, mixtures of pentaerythritol with pentaerythritol derivatives, mannitol or sorbitol. A rosin-maleic anhydride adduct can also be used to produce alkyd resins.

Alkyd resins can be prepared by mixing the ingredients to be reacted, e. g., glycerol, phthalic acid, a fatty acid and the desired modifying ingredients, in the proportions hereinbefore described, and heating the resulting reaction mixture to a temperature between about 200° C. and about 250° C. It is desirable that this heating be carried out in an inert atmosphere, e. g., of nitrogen or carbon dioxide, and the inert gas can conveniently be bubbled through the reaction mixture to effect stirring. The material is maintained at a temperature between about 200° C. and about 250° C., until the acid number and the viscosity of the resin are within the desired range, usually for a time not shorter than about 4 hours and not longer than about 18 hours. The alkyd resins are usually reacted for a time sufficiently long that the acid number is not higher than 10, and a sufficiently long reaction to give an acid number as low as about 2 may be used. The viscosity of the finished resin is also controlled by controlling the reaction time, i. e., a longer reaction time yields a more viscous resin. In general, an alkyd resin having a longer oil length is subjected to a longer reaction than is a resin with a shorter oil length. When the alkyd has been reacted to the requisite extent it is cooled and diluted to the desired per cent of solids with a hydrocarbon solvent, frequently xylene, toluene, a petroleum solvent (e. g., "Varnolene," a fraction obtained in the distillation of petroleum, boiling between 310° F. and 410° F., which consists substantially of high boiling aliphatic hydrocarbons), or an aliphatic hydrocarbon such as a heptane, or an octane. Other solvents, for example higher alcohols of the aliphatic series (e. g., butanols and higher) or higher boiling ethers (e. g., dibutyl ethers, propyl butyl ethers and higher) can be used, but it is usually preferred that the solvent be a simple hydrocarbon. Most commercial alkyds have from about 50 to about 65 weight per cent solids, but the alkyds can be diluted by adding additional solvent, or a non-commercial alkyd may be used having any desired solids content. It is ordinarily economically preferable that the alkyd contain from about 40 to about 65 weight per cent solids, although more dilute solutions can be used; more concentrated alkyds are not commercially feasible, and using more dilute alkyds ordinarily requires distillation of an unreasonable amount of solvent during the heating of the resin after mixing with the hydrolysis products.

When the hydrolysis products of the silane are mixed with the alkyd resin, the resulting mixture is heated. It is believed that the resin mixture is partially condensed during this heating, the formation of water being evidence of such condensation. Usually, it is desirable to distill the water formed during the heating; it is convenient to accomplish this by effecting the heating under reflux, returning to the resin mixture the material that boils substantially above 100° C.

It is frequently advantageous to distill volatile matter other than water during the heating (when the hydrolysis solvent is diethyl ether the other volatile matter is the diethyl ether, and this is distilled along with the water while the material boiling substantially above 100° C. is refluxed). However, when the hydrolysis is conducted in a solvent that is to be present in the finished material, e. g., xylene, and no substantial excess of solvent is present (it is usually desirable that there be from about 50 to about 70 weight per cent solids in the finished resin; preferably, the solids content is from about 55 to about 65 weight per cent) there is no reason to distill any volatile matter other than the water.

The alkyd resin can be mixed with the hydrolysis products directly, i. e., as it is received from the manufacturer, or it can be diluted with a solvent so that the modified resin produced by a method embodying the invention will have about the desired amount of solvents. Alternatively, an alkyd resin produced specifically for use with silane hydrolysis products may be used, or the desired amount of a solvent or solvent mixture may be added to the mixture of alkyd resin and silane hydrolysis products before the mixture is heated.

*Example*

A synthetic resin is produced by a procedure that comprises hydrolyzing an organosilane in a hydrolyzing solution and in the presence of an organic solvent, adding a solution of the hydrolyzed product comprising the organic solvent to an alkyd resin, and heating the resulting mixture according to the following method:

An organosilane (500 grams of ethyltrichlorosilane) is mixed with diethyl ether (2000 cc.), and the resulting solution is poured slowly over a stirred slurry of cracked ice and water (about 1000 grams of water and 1000 grams of ice), the addition of the silane solution being complete in about 15 minutes. As soon as the addition is complete the ether layer is separated from the water layer (in a separatory funnel); the water layer is extracted with diethyl ether (about 250 cc.); and the ether extract is added to the original ether layer. The combined ether solution is washed twice with distilled water (about 100 cc. portions) and dried over anhydrous sodium sulfate (about 50 grams) for 30 minutes. The sodium sulfate is separated from the solution by filtration; the ether solution of hydrolysis products is added to a two liter Claisen flask; and an alkyd resin (550 grams of a short oil length soya modified glycerol phthalate alkyd resin, diluted to 55 weight per cent solids with xylene, prepared by the procedure hereinbefore described, using 3.32 mols of glycerol, 2.22 mols of soy bean oil and 3.08 mols of phthalic anhydride; the ingredients are reacted to an acid number of about 8.2, and the phthalic acid content of the finished resin is about 43 weight per cent; the oil length about 38 per cent) and xylene (250 grams) are added to the flask. Ether is distilled from the flask until the temperature of the liquid rises to about 125° C.; the liquid is then transferred to a two liter three-necked flask fitted with a stirrer and a Stark and Dean trap equipped with a reflux condenser. The stirred liquid is then heated and maintained in gentle reflux for about three hours; during the refluxing xylene and water are distilled at such a rate that the amount of xylene removed amounts to about 200 cc., some water being removed with the xylene. A sample of the cooled resin (which is found to contain about 65 per cent by weight of solids) is diluted with "Varnolene" to about 50 weight per cent solids; this solution is then filmed onto a glass plate and cured by heating in an electric oven for about one hour at 200° C. to a light-colored, clear, glossy, hard, tough, flexible film. A film of the unmodified alkyd resin, cured by heating in an electric oven for one hour at about 150° C., is soft, wrinkled, and brown in color; whereas a film of a silicone modified alkyd resin prepared as described in the example, except that the dried ether solution of the hydrolysis products is diluted with xylene (250 grams) and ether distilled until the liquid temperature rises to about 125° C. before the alkyd resin is added to the solution of hydrolysis products, cured by heating in an electric oven for one hour at about 200° C., is slightly hazy.

It is convenient to sample the mixture of the hydrolyzed silane solution and the alkyd resin periodically during the heating of this mixture, to film the sample on a glass plate and to cure the film by heating it in an electric oven for 15 minutes at about 200° C. Such cured films tend to be hazy if prepared from resin samples that have been heated for only a short period of time (e. g., as little as about one hour), but this haziness gradually diminishes with continued heating; in many instances it is found that a water-clear film results from curing a sample of a resin that has been heated under gentle reflux for from about three to about four hours. In any event, maximum clarity in the cured resin is obtained by continuing the heating until this test (in conjunction with previous experience with the particular resin) indicates optimum clarity. When the method of the invention is used to produce a resin that yields water-clear cured films (e. g., the resin produced as described in the second paragraph of the example) heating is continued until the test indicates that the film cures water-clear.

When the method of the invention is used to produce an improved synthetic resin, the organosilane can be any of those hereinbefore described, and the amount of hydrolysis products of the organosilane that is added to the alkyd resin can be varied within wide limits; for example, the table shows the composition of several resins that can be prepared, using the procedure described in the second paragraph of the example. In the table, the compositions are entered on a weight per cent, solvent free basis; the alkyd resin used is that described in the second paragraph of the example; and the silanes are considered to be completely hydrolyzed and condensed, i. e., it is considered that all hydrolyzable radicals attached to silicon atoms in silane molecules have been replaced by —OH radicals, and that condensation has occurred by reaction between each of these —OH radicals and another —OH radical in the composition, with elimination of water, so that each hydrolyzable radical has been replaced by an oxygen link, so that the average structure of the portion of the composition derived from the silane is represented by the empirical formula $LSi(O)_{1.5}$ when the silicon in the resin is derived from a silane having three hydrolyzable radicals, L being used to designate an organic radical as hereinbefore described. The table, therefore, represents the compositions of the finished resins, on a solvent free basis.

Table

| Sample No. | Alkyd Resin | $CH_3CH_2$—$Si(-O)_{1.5}$ | $CH_3CH_2CH_2CH_2Si(-O)_{1.5}$ |
|---|---|---|---|
| 1 | 35.2 | 64.8 | |
| 2 | 10.9 | 89.1 | |
| 3 | 21.6 | 78.4 | |
| 4 | 32.0 | 68.0 | |
| 5 | 52.3 | | 47.7 |

The method of the invention can be used to produce improved resins containing silicon regardless of the ratio of silicon containing hydrolysis products to alkyd resin, but it is usually desirable that the weight ratio of condensed hydrolysis products to alkyd resin be at least about 1:9, and preferable that it be at least about 1:4. It is usually desirable that the weight ratio of condensed hydrolysis products to alkyd resin be not greater than about 9:1, and preferable that it be not greater than about 4:1. A resin having too low a ratio of condensed hydrolysis products to alkyd resin is not sufficiently improved to justify the expense of modification, while a resin having too high a ratio may lack homogeneity, or be unreasonably expensive.

Having described the invention, I claim:

1. A method of producing synthetic resins that comprises hydrolyzing a silane whose molecule consists of a silicon atom to which are attached four monovalent radicals, from one to two of which are organic radicals attached through a carbon-to-silicon linkage, and the remainder of which are hydrolyzable radicals, in the presence of an organic solvent in a volume equal to at least one-half the volume of the silane, said organic solvent being one which forms a two-phase system with water, adding the resulting solution of the hydrolyzed product, comprising the original organic solvent in a volume equal to at least half the original volume of the silane, to an organic solvent solution of an alkyd resin, and heating while distilling to remove water until a cured film of the product is free from haze.

2. A method of producing synthetic resins as claimed in claim 1 in which the distillation removes the original organic solvent as well as water.

3. A method of producing synthetic resins as claimed in claim 2 in which the organic solvent is a dialkyl ether having from 4 to 6 carbon atoms.

4. A method of producing synthetic resins as claimed in claim 3 in which the organic solvent is diethyl ether.

5. A method of producing synthetic resins as claimed in claim 1 in which the step of hydrolyzing the silane is carried out by bringing a hydrolyzing solution into contact with a solution of the silane in the organic solvent.

RAYMOND H. BUNNELL.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,390,378 | Marsden | Dec. 4, 1945 |

FOREIGN PATENTS

| Number | Country | Date |
|---|---|---|
| 583,754 | Great Britain | Dec. 4, 1948 |

OTHER REFERENCES

Gardner Physical and Chemical Examination of Paints, Varnishes, Lacquers and Colors, 10th edition, 1946 (Gardner Laboratories), pp. 478, 479 and 484. Copy in Div. 50.